United States Patent
Gofron et al.

(10) Patent No.: US 6,324,407 B1
(45) Date of Patent: Nov. 27, 2001

(54) METHOD AND APPARATUS FOR SIGNAL TRANSMISSION WITHIN A WIRELESS COMMUNICATION SYSTEM

(75) Inventors: Kazimierz J. Gofron, Plainfield; Dorothy M. Sadzius, Chicago; Phillip D. Neumiller, Cary; Brian D. James, Buffalo Grove; Vikram Kapoor, Chicago, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/259,011

(22) Filed: Feb. 26, 1999

(51) Int. Cl.$^7$ ........................................................ H04J 1/10
(52) U.S. Cl. ............................ 455/504; 455/119; 455/139
(58) Field of Search ................................ 455/504, 75, 81, 455/550, 136, 138, 141, 119, 116, 139

(56) References Cited

U.S. PATENT DOCUMENTS

| | | | |
|---|---|---|---|
| 5,489,875 | * 2/1996 | Cavers | 330/151 |
| 5,570,350 | * 10/1996 | Myer et al. | 455/38.1 |
| 5,625,871 | * 4/1997 | Myer et al. | 455/33.1 |
| 5,694,395 | * 12/1997 | Myer et al. | 370/480 |
| 5,796,307 | * 8/1998 | Kumagai et al. | 330/149 |
| 6,131,016 | * 10/2000 | Greenstein et al. | 455/69 |

* cited by examiner

Primary Examiner—Daniel Hunter
Assistant Examiner—Thuan T. Nguyen
(74) Attorney, Agent, or Firm—Kenneth A. Haas

(57) ABSTRACT

A properly modulated carrier signal exits transmission circuitry (201) and enters a first and a second mixer (203, 205). The modulated carrier is mixed with a first and a second function by the first and the second mixers (203, 205). The functions are generated by a first and a second signal generator (207, 209). The mixed signals exit the mixers (203, 205), and are amplified (via amplifiers 211–213), to be radiated by an antenna (211). The antenna (221) comprises two orthogonal antenna elements (215, 217), that are in close proximity with one another (although not in contact). One of the mixed signals is radiated on a first element (215), and the other mixed signal is radiated on the second element (217). The resulting signal transmitted from the antenna (221) is the original carrier signal having the plane of polarization constantly changing. Thus a reflected signal emitted an instance earlier cannot interfere with a wave currently emitted.

18 Claims, 2 Drawing Sheets

METHOD AND APPARATUS FOR SIGNAL TRANSMISSION WITHIN A WIRELESS COMMUNICATION SYSTEM

FIELD OF THE INVENTION

The present invention relates generally to wireless communication systems and, in particular, to a method and apparatus for transmitting signals in such wireless communication systems.

BACKGROUND OF THE INVENTION

A typical problem encountered by remote units within wireless communication systems is that of multi-path fading. During multipath fading, a signal that is transmitted to a remote unit is canceled (via destructive interference) by the same signal that has been reflected off of an object. This is illustrated in FIG. 1. As shown in FIG. 1, signal 103 that is transmitted to remote unit 101 is reflected off surface 102. In many cases, the reflected signal 104 will destructively interfere with incoming signal 103, causing a multi-path fade. At the point where the two signals destructively interfere, remote unit 101 may be unable to receive incoming signal 103, possibly resulting in a dropped call. Therefore a need exists for a method and apparatus for transmitting a signal within a communication system that reduces the chance that a signal will undergo multi-path fading.

DETAILED DESCRIPTION OF THE DRAWINGS

To address the need for a method and apparatus for reducing multi-path fading a method and apparatus for transmitting a signal within a communication system is provided. A properly modulated carrier signal exits transmission circuitry and enters a first and a second mixer. The modulated carrier is mixed with a first and a second function by the first and the second mixers. The functions are generated by a first and a second signal generator. The mixed signals exit the mixers, and are amplified, to be radiated by an antenna. The antenna comprises two orthogonal antenna elements that are in close proximity with one another (although not in contact). One of the mixed signals is radiated on a first element and the other mixed signal is radiated on the second element. The resulting signal transmitted from the antenna is the original carrier signal having the plane of polarization constantly changing. Thus a reflected signal emitted an instance earlier cannot interfere with a wave currently emitted.

The present invention encompasses a method for transmitting a signal in order to reduce multipath fading. The method comprises the steps of receiving on a first signal path, a carrier signal having a first phase and carrier frequency, and receiving the carrier signal on a second signal path. The carrier signal is mixed with a first function on the first signal path, wherein the first function has a frequency differing from the carrier frequency, and the carrier signal is mixed with a second function on the second signal path, wherein the second function has a frequency differing from the carrier frequency.

The present invention additionally encompasses a method for transmitting a signal. The method comprises the steps of receiving on a first and second signal path, a carrier signal operating at a carrier frequency ($\omega_c$), and have an associated amplitude (A) and phase ($\Phi$). The carrier signal is mixed with a first function on the first signal path, and a second function on the second signal path. In the preferred embodiment of the present invention the first function has a frequency ($\omega_s$) differing from the carrier frequency, and the second function has a frequency equal to $\omega_s$.

The present invention additionally encompasses an apparatus comprising a first mixing circuit having a carrier signal with a carrier frequency as an input, and also having a first function having a second frequency as an input, and outputting the carrier signal mixed with the first function. The apparatus additionally comprises a second mixing circuit having the carrier signal as an input, and also having a second function having the second frequency as an input, and outputting the carrier signal mixed with the second function.

Figure 1:
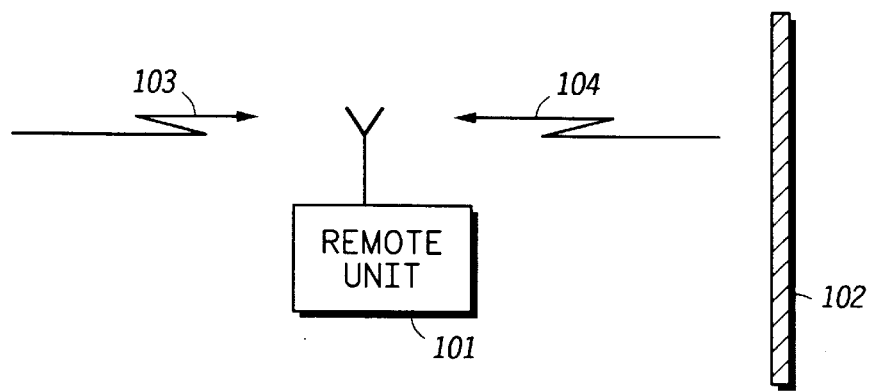
FIG. 1 is an illustration of multi-path scattering.
Figure 2:
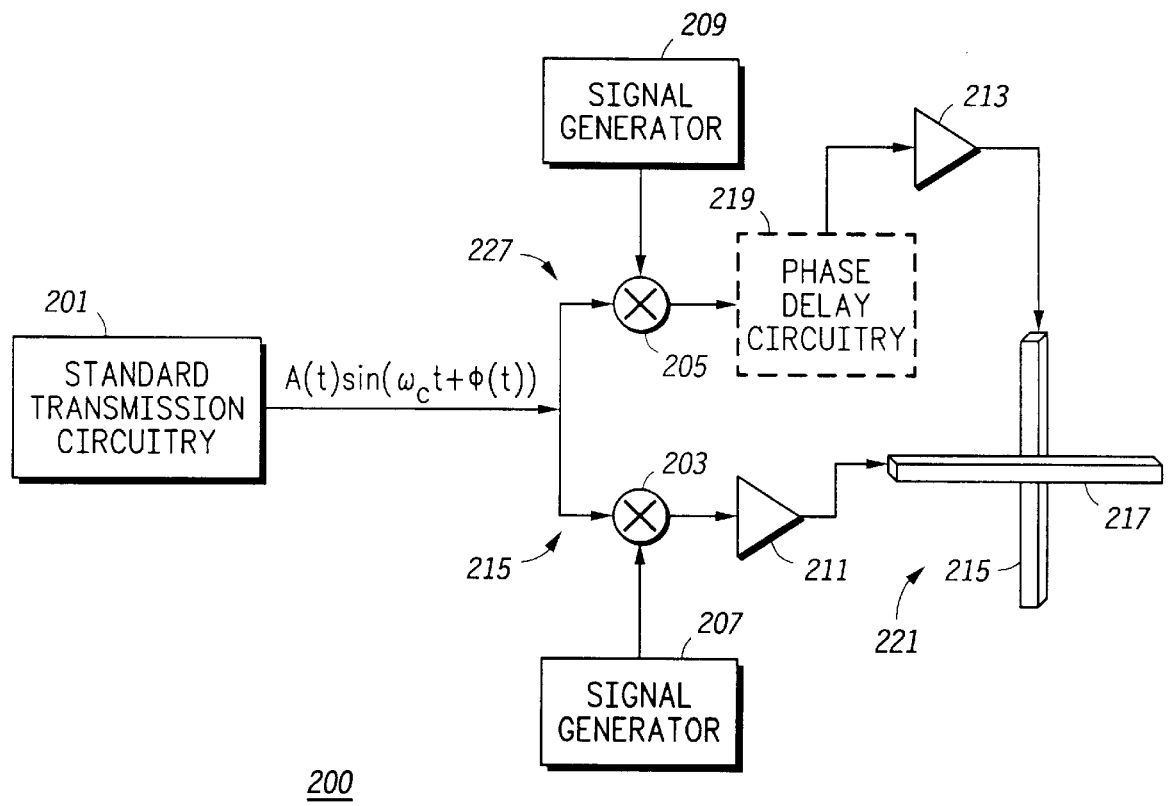
FIG. 2 is a block diagram of a signal transmitter in accordance with the preferred embodiment of the present invention.

FIG. 2 is a block diagram of signal transmitter 200 in accordance with the preferred embodiment of the present invention. As shown, transmitter 200 comprises standard transmission circuitry 201, signal generators 207–209, mixers 203–205, amplifiers 211–213, phase delay circuitry 219, and antenna 221. In the preferred embodiment of the present invention transmission circuitry is a standard base station infrastructure transmitter such as a CDMA BTS SC™-4812T. More particularly, transmission circuitry 201 utilizes a Code Division Multiple Access (CDMA) system protocol as described in Cellular System Remote unit-Base Station Compatibility Standard of the Electronic Industry Association/Telecommunications Industry Association Interim Standard 95 (TIA/EIA/IS-95A), which is incorporated by reference herein. (EIA/TIA can be contacted at 2001 Pennsylvania Ave. NW Washington D.C. 20006). In alternate embodiments transmission circuitry 201 may utilize other analog or digital cellular transmission protocols such as, but not limited to, the Narrowband Advanced Mobile Phone Service (NAMPS) protocol, the Advanced Mobile Phone Service (AMPS) protocol, the Global System for Mobile Communications (GSM) protocol, the Personal Digital Cellular (PDC) protocol, or the United States Digital Cellular (USDC) protocol.

Operation of transmitter 200 in accordance with the preferred embodiment of the present invention occurs as follows: A properly modulated carrier signal exits transmission circuitry 201 and enters mixers 205 and 203. As one of ordinary skill in the art will recognize, carrier signals typically operate at a carrier frequency ($\omega_c$), and have an associated amplitude (A) and phase ($\Phi$). Both the amplitude and the phase may be functions of time, depending upon the particular type of modulation scheme being utilized. Such a modulated carrier signal can be represented by the equation $A(t)\sin(\omega_c t+\Phi(t))$. The modulated carrier is mixed with a first and a second function by mixers 203 and 205. In particular, in a first embodiment of the present invention first signal path 225 of the modulated carrier is mixed with $\sin(\omega_s t)$, and second signal path 227 of the modulated carrier is mixed with $\cos(\omega_s t)$. The functions $\sin(\omega_s t)$ and $\cos(\omega_s t)$ are generated by signal generators 207 and 209, respectively. The mixed signals exit mixers 203–205 and are amplified (via amplifiers 211–213), to be radiated by antenna 221. As shown, antenna 221 comprises two orthogonal antenna elements 215 and 217, that are in close proximity with one another (although not in contact). One of the mixed signals is radiated on element 215, and the other mixed signal is radiated on element 217.

Figure 3:
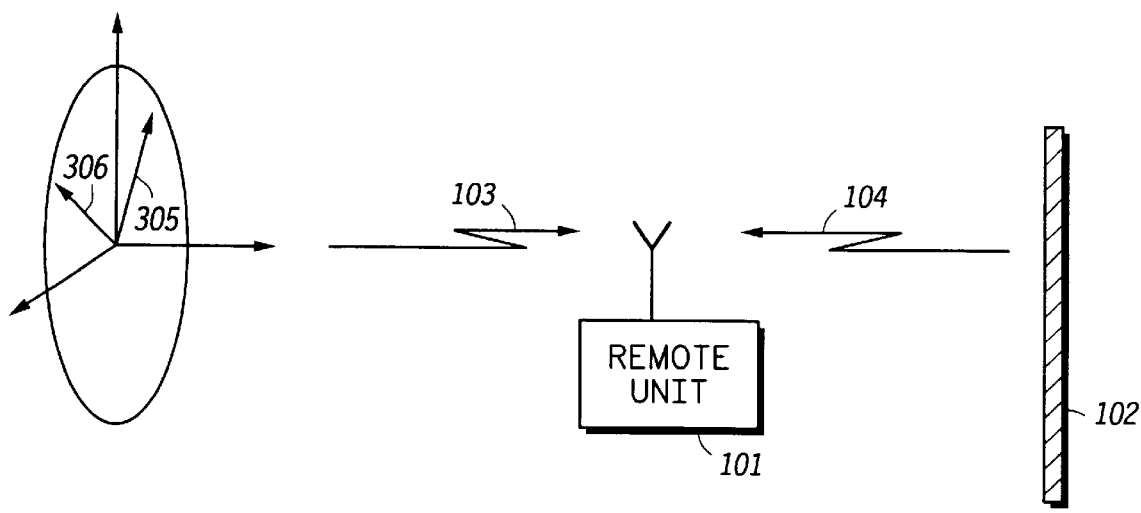
FIG. 3 is an illustration of multi-path scattering in accordance with the preferred embodiment of the present invention.

In the first embodiment of the present invention a carrier signal of frequency $\omega_c$ is mixed with $\sin(\omega_s t)$ and radiated on a first antenna element. The carrier signal is additionally mixed with $\cos(\omega_s t)$ and radiated on an orthogonal antenna element in close proximity to the first antenna element. Because of the principle of superposition of signals, the resulting signal transmitted from antenna 211 is the original carrier signal having the plane of polarization constantly rotating in a circular pattern at frequency $\omega_s$. With a constantly rotating plane of polarization, a reflected signal emitted an instance earlier cannot interfere with a wave currently emitted. Thus, at any remote unit, a reflected wave will not interfere with a transmitted signal because the waves have different polarization states. This is illustrated in FIG. 3 with incoming signal 303 having a polarization 305 differing from the polarization 306 of reflected signal 304.

In a second embodiment of the present invention phase delay circuitry 219 is utilized to delay the phase of one signal path by a constant amount with respect to the other signal path. In a preferred embodiment, the phase of the second signal path is delayed by $\pi/2$ from the phase of the first signal path. The resulting signal transmitted from antenna 221 is the original carrier signal having the polarization state evolving between horizontal linear, circular, and vertical linear polarization at frequency $\omega_s$. In other words, unlike the first embodiment, where the polarization continuously rotates in a circular pattern, in the second embodiment, the state of elliptic polarization of the carrier changes.

In a third embodiment of the present invention signal generators 207–209 generate sine and cosine functions of a random number (R) that changes with respect to time (t) and is held constant for a period of time (T). In a preferred embodiment, R is a random number varying between 0 and 1, that changes with respect to time, and once changed, is held constant for a period of T microseconds (e.g., 0.1 to 1 microseconds). In the third embodiment, signal generator 207 generates $\sin(2\pi R(T,t))$ that is mixed with the carrier on the first signal path, and signal generator 209 generates $\cos(2\pi R(T,t))$ that is mixed with the carrier on the second signal path. The resulting signal transmitted from antenna 221 is the original carrier signal having the plane of linear polarization changing randomly. In other words, unlike the first and second embodiments, where the polarization continuously rotated in a circular or evolved through elliptical polarization states, in the third embodiment, the polarization of the carrier does not rotate at all, but randomly flips, and remains constant for a period of time (T).

In a fourth embodiment of the present invention signal generators 207–209 do not modify the carrier signal (i.e., signal generators 207–209 generate a constant value of 1), however phase delay circuitry 219 changes the relative phase of a signal path by a time-varying amount (f(t)). The resulting signal transmitted from antenna 221 evolves through following polarization states: linear at $\pi/4$, elliptic, circular, linear at $-\pi/4$.

Figure 4:
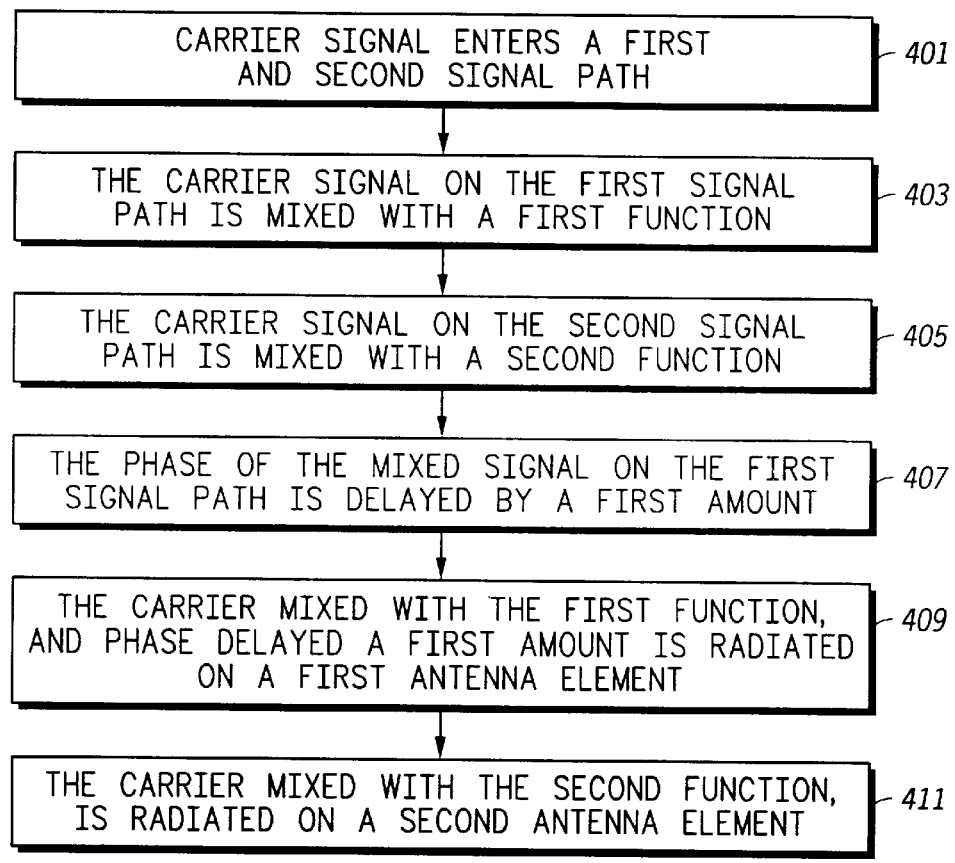
FIG. 4 is a flow chart showing operation of the signal transmitter of FIG. 2 in accordance with the preferred embodiment of the present invention.

FIG. 4 is a flow chart illustrating operation of the signal transmitter of FIG. 2 in accordance with the preferred embodiment of the present invention. The logic flow begins at step 401 where a carrier signal enters a first and a second signal path. At step 403 the carrier signal on the first signal path is mixed with a first function and at step 405 the carrier signal on the second signal path is mixed with a second function. At step 407 the phase of the mixed signal on the first signal path is delayed by a first amount. Table 1 shows the first function, second function, and phase delay amount for each embodiment described above.

TABLE 1

First function, second function, and phase delay amount for four embodiments of the invention.

| Embodiment | First function | Second function | Phase delay amount |
|---|---|---|---|
| 1 | $\sin(\omega_s t)$ | $\cos(\omega_s t)$ | 0 |
| 2 | $\sin(\omega_s t)$ | $\cos(\omega_s t)$ | Constant |
| 3 | $\sin(2\pi R(T,t))$ | $\cos(2\pi R(T,t))$ | 0 |
| 4 | 1 | 1 | f(t) |

Continuing, at step 409 the carrier mixed with the first function, and phase delayed a first amount is radiated on a first antenna element, and at step 411 the carrier signal mixed with the second function is radiated on a second antenna element. As described above both the first and the second antenna elements are orthogonal to one another, and are in close proximity.

The descriptions of the invention, the specific details, and the drawings mentioned above, are not meant to limit the scope of the present invention. For example, although the preferred embodiments of the invention were described above utilizing five differing mixing functions (1, $\sin(\omega_s t)$, $\cos(\omega_s t)$, $\sin(2\pi R(T,t))$, and $\cos(2\pi R(T,t))$), and three differing phase delay amounts (0, Constant, and f(t)), any multitude of mixing and phase delay functions may be utilized without varying from the scope of the invention. It is intended that all such modifications come within the scope of the following claims and their equivalents.

What is claimed is:

1. A method for transmitting a signal, the method comprising the steps of:

receiving on a first signal path, a carrier signal having a first phase and carrier frequency;

receiving the carrier signal on a second signal path;

mixing the carrier signal with a first function on the first signal path to produce a first mixed carrier signal, wherein the first function has a frequency differing from the carrier frequency;

mixing the carrier signal with a second function on the second signal path to produce a second mixed carrier signal, wherein the second function has a frequency differing from the carrier frequency;

transmitting the first mixed carrier signal on a first antenna; and transmitting the second mixed carrier signal on a second antenna.

2. The method of claim 1 further comprising the step of delaying the phase of the mixed carrier signal on the first signal path by a first amount.

3. The method of claim 2 wherein the step of delaying the phase of the mixed carrier signal on the first signal path by the first amount comprises the step of delaying the phase of the mixed carrier signal on the first signal path by a first amount first amount that is a constant amount.

4. The method of claim 2 wherein the step of delaying the phase of the mixed carrier signal on the first signal path by the first amount comprises the step of delaying the phase of the mixed carrier signal on the first signal path by a first amount first amount that is a function of time.

5. The method of claim 4 wherein the steps of mixing the carrier signal with the first and the second functions comprises the steps of mixing the carrier signal with a first and a second constant amount.

6. The method of claim 1 wherein the step of mixing the carrier signal with the first function comprises the step of mixing the carrier signal with a sine function that varies with time.

7. The method of claim 6 wherein the step of mixing the carrier signal with the second function comprises the step of mixing the carrier signal with a cosine function that varies with time.

8. The method of claim 1 wherein the step of mixing the carrier signal with the first function comprises the step of mixing the carrier signal with a function that is dependent upon a random number.

9. The method of claim 8 wherein the step of mixing the carrier signal with the second function comprises the step of mixing the carrier signal with a second function that is dependent upon a random number.

10. A method for transmitting a signal, the method comprising the steps of:

receiving on a first signal path, a carrier signal operating at a carrier frequency ($\omega_c$), and having an associated amplitude (A) and phase ($\Phi$);

receiving the carrier signal on a second signal path;

mixing the carrier signal with a first function on the first signal path to produce a first mixed carrier signal, wherein the first function has a frequency ($\omega_s$) differing from the carrier frequency;

mixing the carrier signal with a second function on the second signal path to produce a second mixed carrier signal, wherein the second function has a frequency equal to $\omega_s$;

transmitting the first mixed carrier signal on a first antenna; and transmitting the second mixed carrier signal on a second antenna.

11. The method of claim 10 further comprising the step of delaying the phase of the mixed carrier signal on the first signal path by a first amount.

12. The method of claim 11 wherein the step of delaying the phase of the mixed carrier signal on the first signal path by the first amount comprises the step of delaying the phase of the mixed carrier signal on the first signal path by a first amount first amount that is a function of time.

13. The method of claim 10 wherein the step of mixing the carrier signal with the first function comprises the step of mixing the carrier signal with $\sin(\omega_s t)$.

14. The method of claim 10 wherein the step of mixing the carrier signal with the second function comprises the step of mixing the carrier signal with $\cos(\omega_s t)$.

15. The method of claim 10 wherein the step of mixing the carrier signal with the first function comprises the step of mixing the carrier signal with $\sin(2\pi R(T,t))$, where R is a random number that varies with time (t), and is held constant for a period of time T.

16. The method of claim 15 wherein the step of mixing the carrier signal with the second function comprises the step of mixing the carrier signal $\cos(2\pi R(T,t))$.

17. An apparatus for transmitting a signal, the apparatus comprising:

a first mixing circuit having a carrier signal with a carrier frequency as an input, and also having a first function having a second frequency as an input, and outputting the carrier signal mixed with the first function;

a second mixing circuit having the carrier signal as an input, and also having a second function having the second frequency as an input, and outputting the carrier signal mixed with the second function;

a first antenna having the carrier signal mixed with the first function as an input; and a second antenna having the carrier signal mixed with the second function as an input.

18. The apparatus of claim 17 further comprising phase delay circuitry having the carrier signal mixed with the first function as an input and outputting the carrier signal mixed with the first function with a delayed phase.

* * * * *